Figure 1:
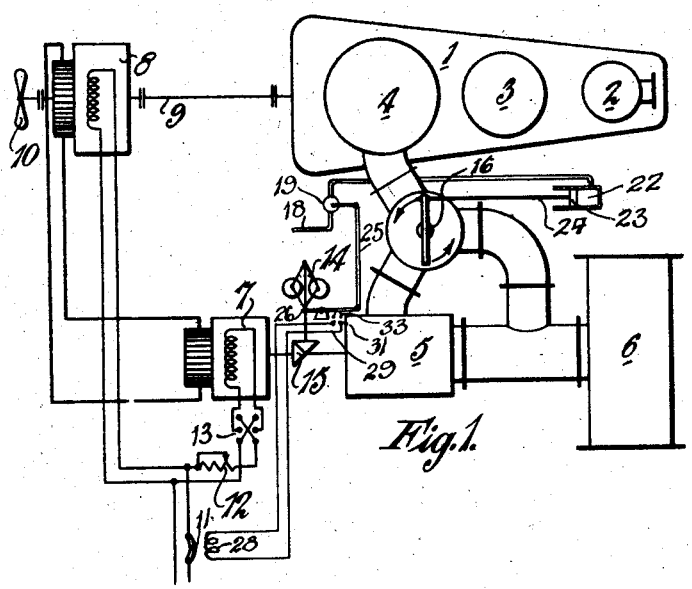

July 5, 1932.   W. HINCHCLIFFE ET AL   1,865,909

MARINE ENGINE AND SHIP'S PROPELLING MACHINERY

Filed May 3, 1929

INVENTORS
William Hinchcliffe and
James Scott.
BY
ATTORNEY

Patented July 5, 1932

1,865,909

UNITED STATES PATENT OFFICE

WILLIAM HINCHCLIFFE, OF HIGHER BEBINGTON, AND JAMES SCOTT, OF BOOTLE, ENGLAND, ASSIGNORS TO ASSOCIATED ELECTRICAL INDUSTRIES LIMITED, A COMPANY OF GREAT BRITAIN

MARINE ENGINE AND SHIP'S PROPELLING MACHINERY

Application filed May 3, 1929, Serial No. 360,166, and in Great Britain May 9, 1928.

This invention relates to marine engines and ships'.propelling machinery, and the object is to employ as an auxiliary to the usual type of reciprocating multiple expansion engine the crank shaft of which is coupled directly to the propelling shaft, a turbine and exhaust condenser plant operated by the exhaust steam from the low pressure cylinder of the reciprocating engine, and coupled electrically to the shafting driving the propeller.

According to the invention the exhaust steam from the low pressure or other cylinder of the reciprocating engine is led to a turbine, and thence to the condenser, the turbine being directly coupled, or coupled through gearing, to an electric generator the current from which supplies a motor or motors directly coupled to or geared to the said shafting, preferably at or near the tail end of the said shafting.

For example the reciprocating engine may be a triple expansion engine taking steam at say 200 lbs. per square inch and exhausting at 4 lbs. per square inch to the turbine, and developing say 4000 to 5000 shaft H. P. A suitable turbine for such combination would develop 1200 to 1500 H. P. which would be transformed by the electric generator into electrical energy and be transmitted through a suitable starting and control and reversing gear to a motor or motors adapted to convert the electrical energy into mechanical energy delivered to the said shafting.

Direct or alternating current may be employed; in the former case shunt or series arrangements of motors may be adopted, with compounding or compensating coils; and in the latter case synchronous motors, synchronous induction motors, commutator motors, induction motors of the wound rotor or squirrel cage rotor type, or combinations of these may be employed; pole or phase changing arrangements or cascade arrangements being provided if necessary to give speed variation.

An auxiliary boiler supplying steam to the turbine at a suitable pressure may be provided to drive the turbine for the operation of auxiliary plant when the main engine is not working; the main generator connected to the turbine, or an auxiliary generator connected to the turbine, may be employed to generate electrical energy for operating the electrical motors for the auxiliary plant.

Where alternating current is employed for the main propelling machinery, an auxiliary direct current generator may be coupled to the turbine for operating the auxiliary plant.

In some cases the turbine may be provided with a section adapted to be operated by steam at the normal boiler pressure, which section would be employed for operating the auxiliary plant when the main engine is stopped, such section being also available for operating the propeller shaft so as to keep the vessel under control in the event of accident to the reciprocating engine.

The arrangement of the motors and the details of construction would be varied in accordance with the type and size of ship to which the invention is applied.

Figure 2:
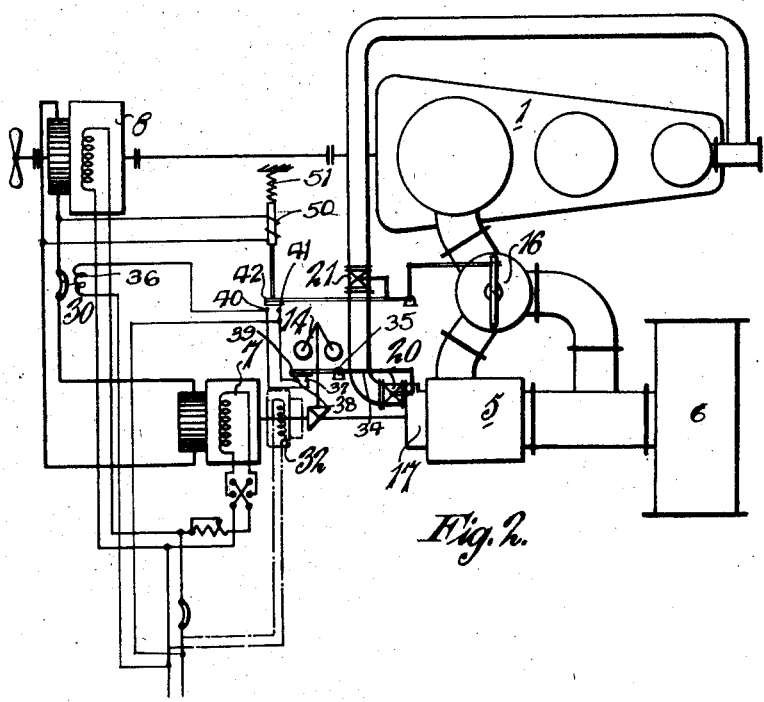

For the better understanding of the invention two embodiments thereof are hereinafter described with reference to the accompanying drawing in which Fig. 1 is a diagram representing an arrangement in which the turbine has but a single section receiving exhaust steam from the reciprocating engine, and Fig. 2 is a diagram representing a system in which the turbine is provided with an additional section adapted to receive live steam from the main boiler or from an auxiliary boiler and can be used for the navigation of the ship whilst the main engine is not operating and also to provide motive power for the operation of auxiliaries.

Referring now to Fig. 1 reciprocating engine 1 has for example three cylinders, 2, 3 and 4. Steam is delivered from the main boiler to the high pressure cylinder 2 and thence to the intermediate pressure cylinder 3 and low pressure cylinder 4 in the usual manner. The exhaust steam from the low pressure cylinder 4 is delivered to a low pressure turbine 5 and thence to the condenser 6.

The turbine 5 drives a direct current generator 7 which in turn delivers electrical energy to a direct current motor 8 which is connected with the propeller shaft 9 and assists the reciprocating engine 1 to drive the propeller 10. The field windings of the generator 7 and motor 8 may conveniently be excited from a separate source of electrical energy not shown in the drawing. A circuit breaker 11 may be inserted in the excitation circuits of the two machines for the purpose of closing and opening that circuit.

This circuit breaker 11 may be provided with remote tripping gear adapted to be operated by means of safety device hereinafter referred to. In addition a rheostat 12 and a reversing switch 13 are connected in the field circuit of the generator 7.

When it is desired to propel the vessel in which the installation is fitted in a normal forward direction the circuit breaker 11 is closed and steam is admitted to the reciprocating engine 1. The exhaust steam from the low pressure cylinder 4 passes to the turbine 5 which therefore commences to rotate with the reciprocating engine. The generator 7 is thus energized and its output is delivered to the motor 8 and transmitted to the propeller shaft 9 and propeller 10 up to a power corresponding to the output of the turbine 5. The proper loading of the generator 7 and turbine 5 by the motor 8 at any particular speed of the propeller shaft 9 and reciprocating engine 1 may be adjusted by means of the rheostat 12 which is connected in the field circuit of the generator 7. If it is desired to reverse the direction of rotation of the propeller 10 by reversal of the reciprocating engine 1 the electrical connections of the field winding of the generator 7 are reversed by means of the reversing switch 13.

In the operation of the system conditions may arise which would lead to dangerous over-speeding of the turbine. Such conditions may arise from unloading of the generator 7 by the motor 8, the steam supply to the turbine 5 being maintained or from failure of the steam supply to the turbine while the propeller shaft 9 is still rotating, when the motor 8 would act as a generator to drive the generator 7 as a motor. In order to prevent occurrences of this nature a governor 14 of centrifugal or other type may be connected to the turbine shaft by a bevel gearing 15 and a two-way diverting valve 16 may be interposed in the connection between the low pressure cylinder 4 and the turbine 5 to divert the exhaust steam from the turbine 5 to the condenser 6 directly. The governor 14 may be so connected with the valve 16 that if the speed of the turbine 5 rises unduly the governor operates the valve 16 to cause the steam to be diverted from the turbine 5 to the condenser 6. Also the governor 14 may be arranged to control the circuit breaker 11 so that upon the occurrence of over-speed the circuit breaker 11 is opened thus de-energizing the field windings of the motor 8 and generator 7. The interconnections between the governor 14 and the two-way valve 16 and the circuit breaker 11 respectively may be effected in any one of several wellknown ways. For example an oil relay system such as is commonly used for similar purposes may be interposed between the governor 14 and the valve 16. Such an arrangement is shown in Fig. 1. In this arrangement oil under pressure is supplied to the pipe 18 and through a cock 19 to an oil cylinder 22. A piston 23 in the oil cylinder 22 is connected by a link 24 to the two-way diverting valve 16. The admission of the oil under pressure to the cylinder 22 is governed by the cock 19, which is operated by means of a link 25 connected to one end of a lever 26 pivoted at 27 and having its other end connected to the governor 14. On the speed of the turbine 5 rising unduly the cock 19 is opened to allow the oil under pressure to flow into the cylinder 22 and thus operate the valve 16 in an anti-clockwise manner so that the steam exhausted from the reciprocating engine is diverted from the turbine 5 to the condenser 6. The circuit breaker 11 may be provided with a tripping coil 28 which is energized by a circuit including contacts 29, 31, which contacts may be closed by means of the switch 33 connected to the lever 26 and operated by the governor 14 at a predetermined speed of the turbine 5.

In the embodiment of the invention shown in Fig. 2 the turbine 5 is provided with an additional section 17, adapted to be supplied with live steam at normal boiler pressure from the main boiler or from an auxiliary boiler.

The steam pipe which supplies live steam at boiler pressure to the additional section 17 of the turbine includes a valve 21 by means of which the supply of live steam to the section 17 can be cut off. The live steam connection also includes a valve 20 which is controlled by a governor such as the centrifugal governor 14 connected to the shaft of the turbine.

In the arrangement shown in Fig. 2 a lever 34 pivoted at 35 is connected at one end to the valve 20 and at the other end to the centrifugal governor 14.

The general connections of the generator 7 and the motor 8 are the same as those described with reference to Fig. 1, with the exception that a switch 30 is introduced in the connections between the armatures of the generator 7 and the motor 8.

In the operation of the system illustrated in Fig. 2 when the engine 1 is delivering its normal full load steam supply, the valve 21 is kept closed and the valve 16 is in such a position that the exhaust steam from the engine 1 is delivered to the turbine 5. The turbine 5 thus rotates and delivers power to generator 7. The generator 7 converts the power into electrical form and delivers it to the motor 8. If, for any reason, the speed of the main engine and propeller shaft drops to such a value that the voltage generated by the generator 7 falls to a value below which any auxiliary electrical devices, such, for example, as an electro-magnet 50 connected to operate a switch 42 which may be connected to the generator 7, cannot operate, that is, the spring 51 biases the switch 42 to closed position which in turn opens the valve 21 by means of a bell crank lever 43 to admit live steam to the section 17 of the turbine. The live steam so admitted is governed by the governor 14 and valve 20 so that the speed of the turbine is maintained substantially constant at a value which ensures that the generator 7 generates an electromotive force sufficiently high to secure proper operation of the auxiliaries. When the speed of the propeller shaft drops to a predetermined value the switch 30 is opened by means of a tripping coil 36, which is energized by a circuit including contacts 37 and 38 closed by a switch 39 carried at the remote end of the lever 34. The opening of the switch 30 prevents the generator 7 from being excessively loaded by the motor 8. The circuit of the tripping coil 36 also includes two contacts 40, 41, which may be closed by the switch 42 when the voltage of the generator 7 drops to a predetermined value. As shown, the switch 42 is connected to one arm 43 of a bell crank lever, the other arm of which is connected by a link 44 to the steam diverting valve 16.

Instead of connecting the auxiliaries to the terminals of the generator 7, an auxiliary dynamo 32 may be coupled to the turbine shaft and the auxiliaries may be connected to this dynamo. In this case the governor 14 is so set as to control the speed of the turbine, so that the voltage generated by the dynamo 32 is maintained at a value at which the auxiliaries can be operated.

The switch 30 may be coupled to the valve 21 so that when the valve 21 is opened to admit live steam to the turbine the switch 30 is opened, thus removing the propulsion load from the generator 7. Alternatively, the switch 30 may be connected with the valve 20 or with the governor 14, so that it is opened at a predetermined speed of the turbine shaft. The valve 16 may be connected with the valve 21 so that when the valve 21 is opened to admit live steam to the turbine 5 the valve 16 diverts the exhaust steam from the turbine to the condenser 6. If, for any reason, it is desired to navigate the ship without using the main reciprocating engine, live steam may be supplied to the additional section 17 of the turbine. The power may be delivered to the propeller shaft 9 by means of the generator 7 and motor 8, and the direction of rotation of the propeller shaft 9 may be controlled by the reversing switch 13. The speed may be controlled by the rheostat 12. Likewise for the supply of power to the auxiliaries while the reciprocating engine is not working, live steam from the main or auxiliary boiler may be supplied to the turbine section 17, the governor 14 operating the valve 26 to maintain the speed substantially constant.

We claim as our invention:—

1. Marine propulsion system comprising a reciprocating steam engine driving a propeller shaft, a turbine utilizing the exhaust steam of said engine, an electric generator driven by said turbine, an electric motor mechanically connected to said propeller shaft and supplied with power from said generator, a governing device responsive to the speed of the turbine, a valve for controlling the supply of steam to the turbine and switch means in the electrical connections of the generator and the motor, both said valve and switch means being operatively connected with said governing device so that when the turbine speed rises above a predetermined value the valve is operated to shut off the steam supply and at the same time the switch means are operated to prevent either electrical machine supplying current to the other.

2. Marine propulsion system comprising a reciprocating steam engine driving a propeller shaft, a turbine utilizing the exhaust steam of said engine, a condenser connected to said turbine, an electric generator driven by said turbine, an electric motor mechanically connected to said propeller shaft and supplied with power from said generator, a governing device responsive to the speed of the turbine a valve for controlling the supply of steam to the turbine by which steam can be bypassed from the turbine direct to the condenser, and switch means in the electrical connections of the generator and the motor, both said valve and switch means being operatively connected with said governing device so that when the turbine speed rises above a predetermined value the valve is operated to shut off the steam supply from the turbine and divert the steam to the condenser and at the same time the switch means are operated to prevent either electrical machine supplying current to the other.

3. Marine propulsion system comprising a reciprocating steam engine driving a propeller shaft, a turbine utilizing the exhaust steam of said engine, an electric generator driven by said turbine, an electric motor mechanically connected to said propeller shaft and supplied with power from said generator which also supplies power for auxiliary purposes, a governing device responsive to the speed of the turbine, a valve for controlling the supply of steam to the turbine and switch means in the electrical connections of the generator and the motor, both said valve and switch means being operatively connected with said governing device so that when the turbine speed rises above a predetermined value the valve is operated to shut off the steam supply and at the same time the switch means are operated to prevent either electrical machine supplying current to the other, and when the turbine speed falls below a second predetermined value the motor connected to the propeller shaft is cut out so as to relieve the turbine of propulsion load.

4. Marine propulsion system comprising a reciprocating steam engine driving a propeller shaft, a turbine utilizing the exhaust steam of said engine and provided with an additional section means for supplying live steam to said additional section of the turbine for maintaining the turbine in operation when the exhaust steam is insufficient to do so, an electric generator driven by said turbine, an electric motor mechanically connected to said propeller shaft and supplied with power from said generator, an auxiliary generator driven by the turbine and supplying power for auxiliary purposes, a governing device responsive to the speed of the turbine, a valve for controlling the supply of exhaust steam to the turbine, a valve for controlling the supply of live steam to the additional section of the turbine, and switch means in the electrical connections of the generator and the motor, both said exhaust steam valve and switch means being operatively connected with said governing device so that when the turbine speed rises above a predetermined value the valve is operated to shut off the exhaust steam supply and at the same time the switch means are operated to prevent either electrical machine supplying current to the other, and when the turbine speed falls below a second predetermined value the motor connected to the propeller shaft is cut out so as to relieve the turbine of propulsion load, and means connecting the live steam valve to the switch means to ensure the opening of said live steam valve when the propulsion load is removed from the turbine and thereby maintain the supply of energy from the auxiliary generator.

5. Marine propulsion system comprising a reciprocating steam engine driving a propeller shaft, a turbine utilizing the exhaust steam of said engine and provided with an additional section, means for supplying live steam to said additional section of the turbine for maintaining the turbine in operation when the exhaust steam is insufficient to do so, an electric generator driven by said turbine, an electric motor mechanically connected to said propeller shaft and supplied with power from said generator which also supplies power for auxiliary purposes, a governing device responsive to the speed of the turbine, a valve for controlling the supply of exhaust steam to the turbine, a valve for controlling the supply of live steam to the additional section of the turbine, and switch means in the electrical connections of the generator and the motor, both said exhaust steam valve and switch means being operatively connected with said governing device so that when the turbine speed rises above a predetermined value the exhaust steam valve is operated to shut off the steam supply and at the same time the switch means are operated to prevent either electrical machine supplying current to the other, and when the turbine speed falls below a second predetermined value the motor connected to the propeller shaft is cut out so as to relieve the turbine of propulsion load, and means connecting the live steam valve to the governing device so as to open said live steam valve when the speed of the turbine approaches said second predetermined value, but before removing the propulsion load from the turbine.

In testimony whereof we have hereunto subscribed our names this eighteenth day of April 1929.

WILLIAM HINCHCLIFFE.
JAMES SCOTT.